United States Patent Office 3,778,465
Patented Dec. 11, 1973

3,778,465
PROCESS FOR THE PRODUCTION OF HYDROXY-FATTY ACID ESTERS
Joachim Barnstorf, Dusseldorf-Holthausen, Germany, assignor to Henkel & Cie GmbH, Dusseldorf-Holthausen, Germany
No Drawing. Filed Apr. 27, 1971, Ser. No. 137,968
Claims priority, application Germany, May 2, 1970, P 20 21 530.9
Int. Cl. C07c 67/00, 69/66; C11c 3/00
U.S. Cl. 260—409                                      10 Claims

ABSTRACT OF THE DISCLOSURE

A process for the production of hydroxy-fatty acid esters comprising hydrogenating epoxidized fatty acid esters with hydrogen in the presence of heavy metal catalysts of the 8th Group of the Periodic Table at temperatures between 100° C. and 250° C. and a hydrogen pressure of at least 50 atmospheres and recovering said hydroxy-fatty acid esters.

THE PRIOR ART

It is known that epoxidized higher carboxylic acids or their esters can be catalytically hydrogenated to hydroxy-fatty acids or hydroxy-fatty acid esters. According to Mack et al., Journal of Organic Chemistry, 1953, 18, pp. 686–692, only palladium catalysts are to be used as hydrogenation catalysts. Nickel catalysts, which are customarily used in hydrogenations, did not give satisfactory hydrogenation results at temperatures between 25° and 200° C. and hydrogen pressures in the range from 1 to 15 atm. It is mentioned in the same literature reference that hydrogenation experiments have also been carried out with Raney nickel, but it is also pointed out that these nickel catalysts are obviously specially prepared catalysts. The special method of preparation of these catalysts is not known. The publication referring to this, reported in the above-mentioned literature reference, gives no information on the method of preparation of the nickel catalyst. The satisfactory hydrogenation results which have been obtained with this special nickel catalyst at 50° C. and 40.8 atm. pressure of hydrogen could not be reproduced with an ordinary nickel catalyst according to the reference quoted above.

On the basis of the above-described facts, on the other hand, a considerableurge must exist to develop a technically utilizable process for the preparation of hydroxy-fatty acid esters by hydrogenation of epoxidized fatty acid esters in which, instead of the expensive palladium catalyst, catalysts from the 8th Group of the Periodic Table may be used as hydrogenation catalysts.

OBJECTS OF THE INVENTION

An object of the invention is the development of a process for the hydrogenation of epoxidized fatty acid esters using conventional hydrogenation catalysts.

Another object of the invention is the development of a process for the production of hydroxy-fatty acid esters comprising hydrogenating epoxidized fatty acid esters with hydrogen in the presence of heavy metal catalysts of the 8th Group of the Periodic Table at temperatures between 100° C. and 250° C. and a hydrogen pressure of at least 50 atmospheres and recovering said hydroxy-fatty acid esters.

A yet further object of the invention is the development of a proces for the production of higher hydroxy-fatty acid esters of lower alkanols which consists essentially of subjecting an epoxidized higher fatty acid ester of a lower alkanol in the presence of at least 50% by weight, based on said epoxidized fatty acid ester, of the same lower alkanol, to hydrogenation with hydrogen at a temperature of from 100° C. to 250° C. and a hydrogen pressure of from 100 to 300 atmospheres in the presence of from 0.5% to 20% by weight, based on said epoxidized fatty acid ester, of a hydrogenation catalyst containing at least 20% by weight of a metal selected from the group consisting of nickel and cobalt, and recovering said higher hydroxy-fatty acid esters of lower alkanols.

These and other objects of the invention will become more apparent as the description thereof proceeds.

DESCRIPTION OF THE INVENTION

It has now been found that epoxidized higher fatty acid esters may be hydrogenated to higher hydroxy-fatty acid esters utilizing hydrogenation catalysts based on heavy metals of the 8th Group of the Periodic Table. In the presence of such catalysts, a complete hydrogenation of the epoxide to the corresponding hydroxy compound is possible when this is carried out using the usual hydrogenation temperatures of 100° C. to 250° C. at hydrogen pressures of at least 50 atmospheres.

The invention therefore relates to a process for the preparation of hydroxy-fatty acid esters by hydrogenation of epoxidized fatty acid esters in the presence of heavy metal catalysts from the 8th Group of the Periodic Table, which is characterized in that the hydrogenation is carried out at temperatures between 100° C. and 250° C. and pressures of hydrogen of at least 50 atmospheres.

The hydrogen pressures to be used preferably lie in the range from 100 to 300 atmospheres and in individual cases depend upon the hydrogenation apparatus available.

The hydrogen used for the hydrogenation may also be diluted by inert gas, but not more inert gas should be present during the hydrogenation than will ensure a five-fold excess of hydrogen over the theoretically required amount.

By heavy metal catalysts of the 8th Group of the Periodic Table are meant in particular nickel- and/or cobalt-containing catalysts, for example Raney nickel or Raney cobalt. The produtcion of the active catalyst from the alloy can be effected in any usual way, for example by treatment of suitable Raney alloys with alkali metal hydroxide solutions at normal or elevated temperature.

Moreover, mixed catalysts are suitable which contain, besides the said heavy metals, further components customary in hydrogenation catalysts, as for example, copper, manganese, zinc, vanadium, iron and/or activators, as for example, alkaline earth metals, alkali metals, rare earth metals, zirconium, thorium, and also inert carrier materials such as aluminum oxide or silicon dioxide.

Such mixed catalyst should contain at least 20% by weight, calculated as metal, of the said heavy metals of the 8th Group of the Periodic Table. For example, a suitable mixed catalyst may contain, besides at least 20% by weight of nickel or cobalt, 1 to 50% by weight of iron and/or copper, 1 to 20% by weight of magnesium and/or zinc and/or manganese—all calculated as the metal—as well as 0 to 70% by weight of inert carrier material, especially aluminum oxide.

Mixed catalysts, which owing to their method of production (precipitation from their salt solutions by means of bases) are present in the form of oxides, should be reduced as usual in a current of hydrogen before being used in the actual hydrogenation process. Special measures during the reduction are not necessary. The reduction may be carried out for example according to the manufacturer's instructions using commercial mixed catalyst.

Raney cobalt and mixed catalysts in which nickel is present in the said amount as the heavy metal of the 8th Group are preferably used as the hydrogenation catalysts.

The epoxidized fatty acid esters which are used as starting substances include esters of aliphatic carboxylic acids containing 6 to 22 carbon atoms with mono- or polyhydric aliphatic alcohols, for example epoxidized esters of hexenoic acid, octenoic acid, decenoic acid, dodecenoic acid, octadecenoic acid, octadecanedienoic acid, octadecanetrienoic acid, docosenoic acid, docosanepentadienoic acid and eicosenoic acid, which may be present singly or as a mixture of homologues. Preferably, these epoxidized fatty acid esters having from 6 to 22 carbon atoms in the fatty acid chain are esterified with lower aliphatic alcohols having 1 to 4 carbon atoms, for example alkanols such as methyl alcohol, ethyl alcohol, etc., alkanediols such as ethylene glycol, propylene glycol, etc., alkanetriols such as glycerol. More particularly the fatty acids are esterified with alkanols having 1 to 4 carbon atoms, especially methy alcohol.

Epoxidation products of naturally occurring triglyceride mixtures with a high content of unsaturated components are of special importance as starting substances in the process of the invention, for example soya bean oil, rape oil, peanut oil, tall oil, olive oil, linseed oil, safflower oil, possibly also cottonseed oil or fish oils, as for example herring oil and whale oil. These may be used as starting substances in the process of the invention both in the form of epoxidized triglyceride mixtures and in the form of their inter-esterification products with lower aliphatic alcohols, especially methyl alcohol.

When inter-esterification mixtures are used, the epoxidation of the starting substances may be carried out both before and after the inter-esterification with lower aliphatic alcohols.

It is advantageous to carry out the hydrogenation according to the invention in the presence of a solvent. The presence of a solvent not only gives a more economical use of the hydrogenation catalysts employed but also at the same time ensures a better transportability both of the starting substances and of the resulting hydroxy-fatty acid esters. All substances which are inert under the hydrogenation conditions and can also be easily separated from the products of the process, for example paraffin hydrocarbons or aromatic hydrocarbons having 6 to 12 carbon atoms are basically suitable as solvents. Lower aliphatic alcohols with 1 to 4 carbon atoms, such as those listed above, have proved specially suitable as solvents. Since inter-esterifications are also to be expected under the hydrogenation conditions, the choice of the particular lower aliphatic alcohol to be used as solvent depends upon the alcohol component required in the end product, i.e. if inter-esterification mixtures of natural epoxidized glyceride mixtures are used as starting substances, then for uniformity of the product, the alcohol which is already present in the inter-esterification mixture as the alcoholic component should be used as solvent. Preferably, the solvent is employed in an amount of at least 50%, preferably 75% to 300% by weight, based on the epoxidized fatty acid esters.

The hydrogenation process according to the invention may be carried out both batchwise and continuously. The catalyst is usually employed in amounts of from 0.5% to 20%, preferably 2% to 20% by weight, based on the epoxidized fatty acid esters. In continuous operation using a Raney catalyst, the latter is added in amounts of 2% to 20% by weight, based on the epoxidized starting material, and the suspension is pumped continuously through the hydrogenation furnace.

When the above-mentioned mixed catalysts are used for the hydrogenation, the process can also be developed continuously by using the catalysts in lump form and placing them compactly in the hydrogenation apparatus, and allowing the starting material to be hydrogenated to trickle over this solid catalyst bed under the said hydrogenation conditions, throughputs of 50 to 500 ml. per hour per liter of catalyst volume being specially advantageous.

The hydrogenation may be carried out in any usual pressure hydrogenation apparatus. In continuous operation a hydrogenation pressure apparatus with a gas circulation system is advantageously used, and the hydrogenation gas is returned to the process.

Preferably, the process of the invention is a process for the production of higher hydroxy-fatty acid esters of lower alkanols which consists essentially of subjecting an epoxidized higher fatty acid ester of a lower alkanol in the presence of at least 50% by weight, based on said epoxidized fatty acid ester, of the same lower alkanol, to hydrogenation with hyrogen at a temperature of from 100° C. to 250° C. and a hydrogen pressure of from 100 to 300 atmospheres in the presence of from 0.5% to 20% by weight, based on said epoxidized fatty acid ester, of a hydrogenation catalyst containing at least 20% by weight of a metal selected from the group consisting of nickel and cobalt and recovering said higher hydroxy-fatty acid esters of lower alkanols.

The hydroxy-fatty acid esters prepared in the process according to the invention have an epoxide content which lies under the limits of detection. Consequently, the hydrogenation proceeds under the said hydrogenation conditions when the described catalysts are used, more completely than it does in the hydrogenation in the presence of palladium catalysts known from the literature which, in the case of the hydrogenation of epoxy-stearic acid, leads to a product with an epoxide content of 0.05%.

Owing to their bifunctionality, the products of the process can be used in a variety of ways. A remarkable possible use consists in their employment as raw materials for polyurethanes, polyesters or the like, when both in the form of their esters and in the form of the free acids, they may serve as a substitute for relatively expensive ricinoleic acid. They can also be converted into dicarboxylic acids by alkaline fission or ozonolysis and may be used in the form of their salts, particularly the lithium salt, as high-grade lubricant additives.

The advantages obtainable with the invention consist especially in that the hydroxycarboxylic acids utilizable as valuable raw materials have become available in a simple and economic way. By the process according to the invention, not only is the necessity to use expensive and sensitive catalysts eliminated, but also a more complete hydrogenation of the epoxidized starting material and in consequence a product of better quality is attained.

The following examples are illustrative of the practice of the invention without being limitative in any manner.

EXAMPLES

The epoxidized soya bean ester used as starting substance in the following examples was prepared as follows:

1.2 kg. of 70% hydrogen peroxide was added dropwise at 60° C. within a period of 2 hours with vigorous stirring into a mixture of 2.94 kg. of soya bean oil (acid value 0.35, saponification value 191, iodine value 133), 350 gm. of glacial acetic acid and 375 gm. of an ion exchange resin "Dowex 50 Wx2" moistened with glacial acetic acid. The mixture was stirred at 60° C. for a further 4 hours and the ion exchange resin was filtered off. The mixture was then washed with water until neutral and dried at 100° C. in a water-jet vacuum. The light yellow reaction product, of which 2.85 kg. were obtained, had an epoxide oxygen content of 6.2%. For the inter-esterification, 2.6 kg. of this epoxidation mixture were boiled under reflux for 2 hours with 2.4 gm. of potassium hydroxide in 2 kg. of methanol. After distilling off the methanol, 220 gm. of glycerine were recovered. The epoxidized soya ester (methyl ester) was washed with water until neutral and dried at 70° C. and 15 mm. Hg. It had a saponification value of 179 and a content of epoxide oxygen of 6.1%.

Example 1

300 gm. of the above epoxidized soya ester, 300 gm. of methanol and 30 gm. of Raney nickel were placed in a 1-liter autoclave. The reaction mixture was stirred for 3 hours at 180° C. with a hydrogen pressure of 250 atmospheres. After cooling, the reaction mixture was filtered from the catalyst and the methanol then distilled off. The resulting colorless residue had a saponification value of 183 and an OH value of 212. Epoxide oxygen was not detectable.

Example 2

In the process according to Example 1, 300 gm. of the above epoxidized soya ester in 300 gm. of methanol were hydrogenated in the presence of 30 gm. of Raney cobalt at 200° C. for 3 hours at a hydrogen pressure of 250 atmospheres. The product, worked up as in Example 1, had a saponification value of 170 and an OH value of 187 and was free from epoxide.

Example 3

A vertical reaction tube of 3 cm. diameter and 1.3 m. length was filled with 900 ml. of a catalyst compressed into 4 mm. tablets, consisting of 60% of NiO, 26% of CuO and 14% of MnO. The catalyst was reduced in a current of hydrogen initially without pressure and later at 260 atmospheres, for 48 hours at a furnace temperature of 240° C. Then a mixture of 70 ml. of the above epoxidized soya ester and 140 ml. of methanol was passed through the catalyst bed per hour at a furnace temperature of 150° C. and a hydrogen pressure of 260 atmospheres, 4 normal cubic meters of hydrogen being circulated per hour. The outflowing material was free from catalyst and had, after distillation of the methanol, a saponification value of 173 and an OH value of 223. The epoxide content of the product was below the detectable limits.

The preceding specific embodiments are illustrative of the practice of the invention. It is to be understood, however, that other expedients known to those skilled in the art or disclosed herein may be employed without departing from the spirit of the inveniton or the scope of the appended claims.

I claim:

1. A process for the production of hydroxy-fatty acid esters consisting essentially of hydrogenating epoxidized fatty acid esters with hydrogen in the presence of heavy metal catalysts containing at least 20% by weight, calculated as metal, of a metal selected from the group consisting of nickel and cobalt at temperatures between 100° C. and 250° C. and a hydrogen pressure of at least 50 atmospheres and recovering said hydroxy-fatty acid esters.

2. The process of claim 1 wherein Raney cobalt is employed as said heavy metal catalyst.

3. The process of claim 1 wherein said heavy metal catalyst is present in an amount of from 2% to 20% by weight, based on said epoxidized fatty acid ester.

4. The process of claim 1 wherein said epoxidized fatty acid ester is passed continuously through a compact bed of said heavy metal catalyst with a throughput speed of 50 to 500 ml. per hour per liter of catalyst volume.

5. The process of claim 1 wherein said hydrogen pressure is between 100 and 300 atmospheres.

6. A process for the production of higher hydroxy-fatty acid esters of lower alkanols which consists essentially of subjecting an epoxidized higher fatty acid ester of a lower alkanol in the presence of at least 50% by weight, based on said epoxidized fatty acid ester, of the same lower alkanol, to hydrogenation with hydrogen at a temperature of from 100° C. to 250° C. and a hydrogen pressure of from 100 to 300 atmospheres in the presence of from 0.5% to 20% by weight, based on said epoxidized fatty acid ester, of a hydrogenation catalyst containing at least 20% by weight of a metal selected from the group consisting of nickel and cobalt and recovering said higher hydroxy-fatty acid esters of lower alkanols.

7. The process of claim 6 wherein said hydrogenation catalyst is Raney cobalt.

8. The process of claim 6 wherein said hydrogenation catalyst is present in an amount of from 2% to 20% by weight, based on said epoxidized fatty acid ester.

9. The process of claim 6 wherein said epoxidized higher fatty acid ester of a lower alkanol is the methyl ester of an epoxidized fatty acid having 6 to 22 carbon atoms.

10. The process of claim 6 wherein said epoxidized fatty acid ester is passed continuously through a compact bed of said heavy metal catalyst with a throughput speed of 50 to 500 ml. per hour per liter of catalyst volume.

References Cited

UNITED STATES PATENTS

| 2,727,048 | 12/1955 | Mack et al. | 260—409 |
| 3,028,431 | 4/1962 | Webb | 260—594 |

FOREIGN PATENTS 970,790  9/1964  Great Britain.

OTHER REFERENCES

Ross et al.: J. Am. Chem. Soc., vol. 71, pp. 282–6 (1949).

LEWIS GOTTS, Primary Examiner

D. G. RIVERS, Assistant Examiner

U.S. Cl. X.R.

260—484 R, 348 A